United States Patent Office
3,128,751
Patented Apr. 14, 1964

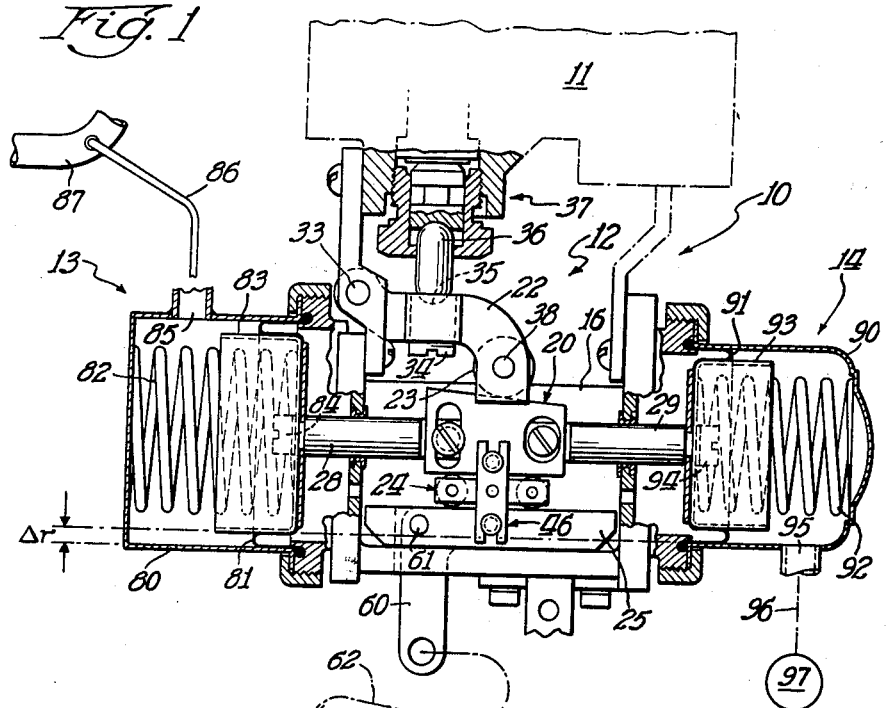
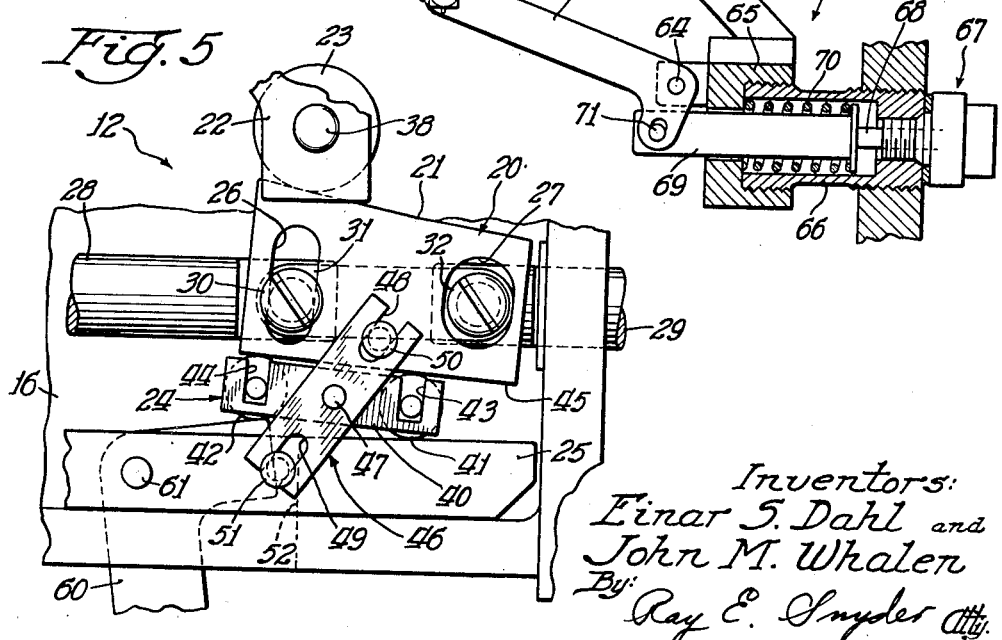
Fig. 1
Fig. 5
Inventors:
Einar S. Dahl and
John M. Whalen
By: Ray E. Snyder Atty.

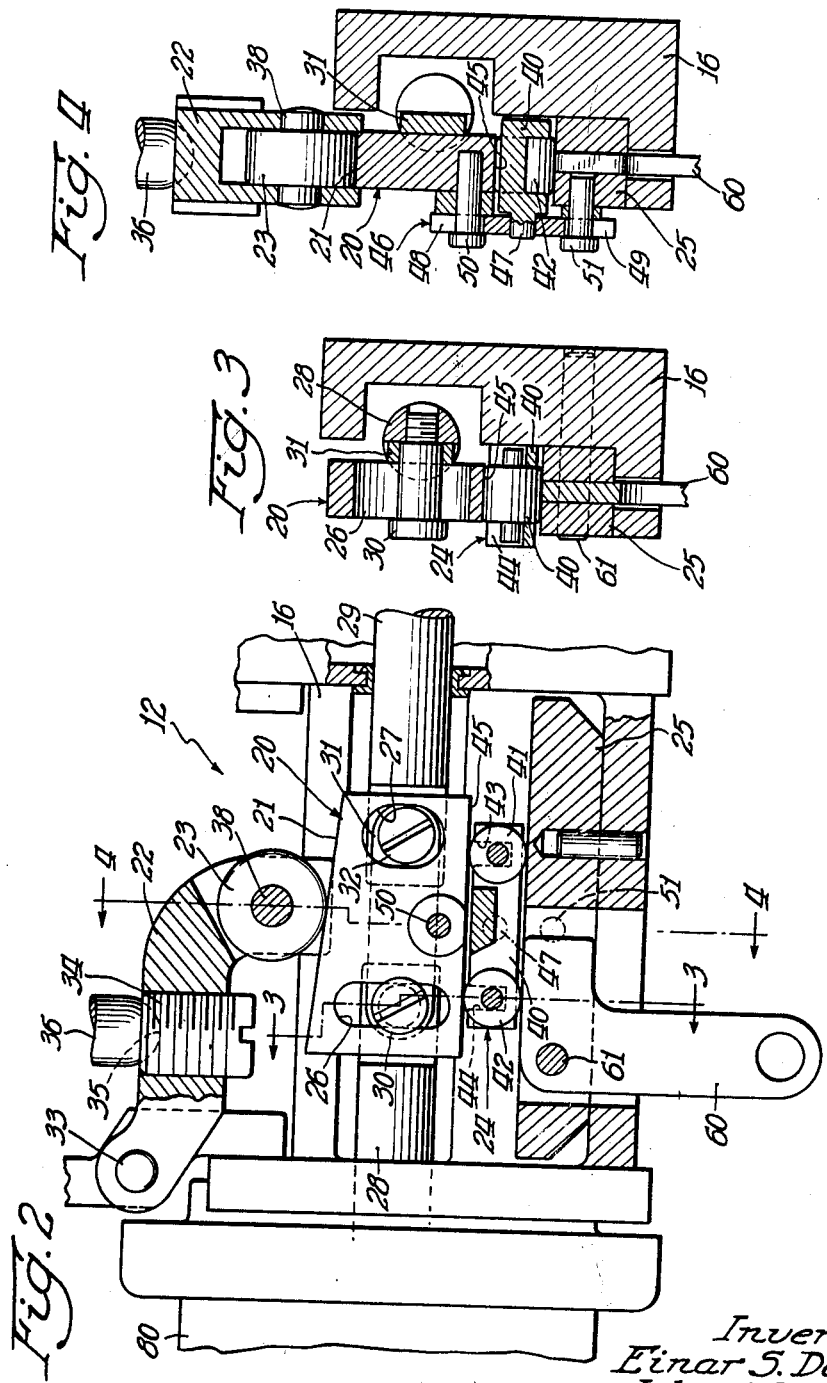

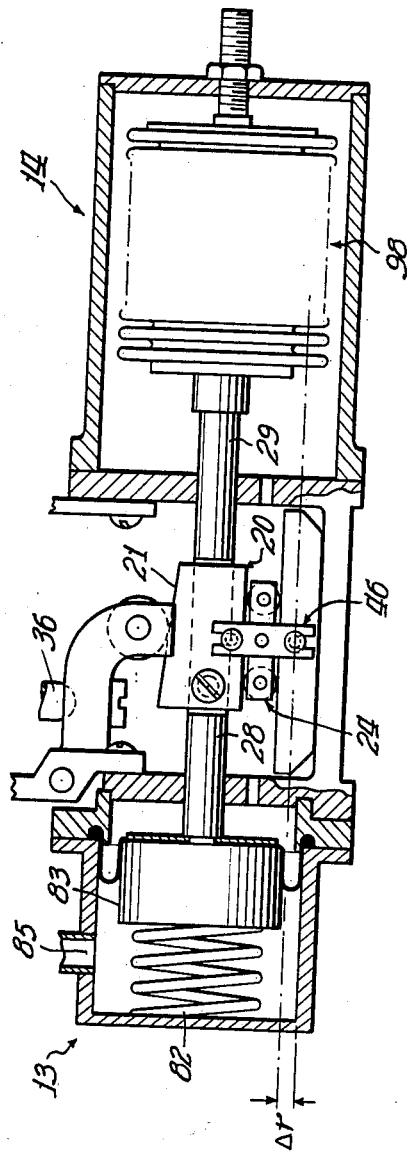

3,128,751
FUEL INJECTION CONTROL MECHANISM
Einar S. Dahl and John M. Whalen, Decatur, Ill., assignors to Borg-Warner Corporation, Chicago, Ill., a corporation of Illinois
Filed Sept. 19, 1961, Ser. No. 139,141
6 Claims. (Cl. 123—140)

This invention relates to a control system for a fuel injection pump particularly adapted to meter charges of fuel supplied to an internal combustion engine in accordance with engine demand and with changes in engine temperature and changes in ambient pressure.

This application is a continuation-in-part of application Serial No. 76,984, filed December 19, 1960, now abandoned.

The control system herein described is designed to control accurately the fuel-to-air ratio supplied to an internal combustion engine for all operating conditions. To maintain the proper fuel-to-air ratio, it is necessary that the control system be responsive to changes in ambient pressure as, for example, due to changes in altitude, and to changes in ambient temperature prior to the time when the engine is warmed up. At comparatively low temperatures, as for example, near the freezing point of water or below, it is necessary to increase the fuel-to-air ratio until the engine reaches normal operating temperature. At high altitudes, it is necessary to reduce the fuel supplied to maintain the proper ratio because less air is sucked into the engine at a given throttle opening.

The control system of the present invention is also responsive to changes in exhaust back pressure as caused by changes in atmospheric pressure. In normal operation, the exhaust back pressure of the engine is higher than the pressure within the air intake manifold. During each exhaust stroke of each of the engine pistons, burned gas within a cylinder is expelled through the exhaust valve until it closes. A portion of the exhaust gas remains trapped in the cylinder near atmospheric pressure. The amount so trapped is to some extent dependent upon the valve overlap of the particular engine and engine speed. Since the pressure within the air intake manifold is normally lower than atmospheric pressure, the exhaust gas trapped in the cylinder will expand during the next intake stroke until the pressure within the cylinder is equal to that in the air intake manifold. During the remainder of the intake stroke, fresh air and fuel vapor are sucked into the cylinder which is burned during the next combustion stroke. The operation of the engine, therefore, is directly affected by changes in exhaust back pressure and the present control system is adapted to meter the output of the fuel injection pump in accordance with these changes as well as within changes in other engine parameters.

It is an object of the present invention to provide an improved control system for a fuel injection pump including a temperature sensitive mechanism effective to enrich the fuel output of the injection pump until the engine reaches normal operating temperature.

It is another object to provide a control system responsive to changes in ambient pressure and changes in exhaust back pressure and effective to control the output of the pump in accordance with these changes.

It is a more particular object to provide a control system for a fuel injection pump for an engine and utilizing a movable cam for controlling the output of the pump, a manifold pressure operated servomotor or actuator for moving the cam as a funcation of engine demand, and a reference pressure servomotor or actuator interconnected on a common shaft with the manifold pressure operated servomotor for modifying the movement of the cam in accordance with changes in ambient pressure so that said system meters the fuel output of the pump substantially as a function of absolute manifold pressure. For purposes of our description the word "servomotor" is used interchangeably with "actuator."

It is a still more particular object to provide a control system of the type described in which a flexible diaphragm is employed in the manifold pressure operated servomotor and in which a flexible diaphragm or evacuated bellows is employed in the reference pressure servomotor and in which the diaphragm of the manifold pressure servomotor is larger in effective area by a predetermined amount than the effective area of the diaphragm or bellows of the reference pressure servomotor thereby causing the control system to respond to changes in engine back pressure.

The invention consists of the novel constructions, arrangements, and devices to be hereinafter described and claimed for carrying out the above-stated objects and such other objects as will appear from the following description of a preferred form of the invention.

FIG. 1 is a view partially in section of the improved control system for a fuel injection pump;
FIG. 2 is an enlarged sectional view of a portion of the controls of FIG. 1;
FIG. 3 is a view taken on line 4—4 of FIG. 2;
FIG. 4 is a view taken on line 4—4 of FIG. 2;
FIG. 5 is a fragmentary view of the control mechanism for one condition of its operation; and
FIG. 6 is a view of a modification of a portion of the system of FIG. 1.

Like characters of reference designate like parts in the several views.

Referring to FIGS. 1 and 2, the improved control system is designated generally by the numeral 10 and is adapted to meter the output of a fuel injection pump 11. The control mechanism 10 comprises a computer or integrator section 12, a manifold pressure responsive servomotor 13, a reference pressure servomotor 14, and a warm-up enrichment control mechanism 15. The computer section 12 is contained within a casing 16 attached to the fuel injection pump 11. The servomotors 13 and 14 are mounted on the casing 16 and are adapted to provide metering forces for operating the computer mechanism 12.

The computer mechanism 12 comprises a movable cam 20 having a cam surface 21, a cam follower arm 22 carrying a roller 23 in contact with the cam surface 21, a supporting roller carriage 24, and a rail 25. The cam 20 is formed with a slot 26 and an access opening 27. The cam 20 is connected to the manifold pressure servomotor 13 by means of a connecting shaft 28, and to the reference pressure servomotor 14 by means of a connecting shaft 29. A pin 30 extends through the slot 26 and is attached to the connecting shaft 28. The pin 30 is also attached to a coupling bar 31 which is fastened to the connecting shaft 29 by means of a screw 32. The two servomotors 13 and 14 are thereby effectively interconnected on a common shaft, and function to move the cam 20 on a common axis. The opening 27 in the cam 20 is provided for easy access in connecting the screw 32 to the shaft 29 and coupling bar 31. This arrangement permits removal and replacement of either of the servomotors 13 or 14 without upsetting the other.

The cam follower arm 22 is pivotally mounted on the casing 16 by means of a pin 33 and carries a threaded adjusting plug 34. The plug 34 is formed with a recess 35 for receiving a connecting link 36 which is adapted to act on a metering valve or shuttle 37 of the fuel injection pump 11. The cam follower 23 contacts the cam surface 21 and is rotatably carried by a pin 38 mounted on the arm 22. The cam follower 23 and arm 22 are effective to product longitudinal movement of the link 36 as the cam 20 is moved under the influence of the servomotors 13 and 14.

The roller carriage 24 comprises a roller block 40 and two rollers 41 and 42. The block 40 is formed with slots 43 and 44 for retaining the rollers 41 and 42, respectively. The rollers contact a smooth edge 45 of the cam 20 and are disposed to roll freely along the rail 25. The roller carriage 24 is retained in place between the cam 20 and the rail 25 by means of a tie bar 46. The tie bar 46 is pivotally attached to the roller block 40 by means of a pin 47 and is formed with longitudinal end slots 48 and 49. The slot 48 receives a pin 50 attached to the cam 20, and the slot 49 receives a pin 51 attached to the rail 25.

The rail 25 is formed with a longitudinal slot 52 in which is disposed a bell crank 60. The bell crank 60 is pivotally mounted on a pin 61 and comprises a part of the warm-up enrichment mechanism 15. The bell crank 60 is connected by means of a cable 62 to a second bell crank 63. The bell crank 63 is pivotally mounted on a pin 64 which is carried by a frame 65. The frame 65 is mounted on a threaded cylindrical plug 66 which, in turn, is mounted in a wall of the engine water jacket. A temperature responsive element 67, such as a Vernitherm unit, is attached to the plug 66 and is in contact with and responsive to the temperature of the engine cooling liquid. The temperature responsive element 67 carries a movable shaft 68 which is adapted to act against a plunger 69 disposed within the plug 66. The plunger 69 is also acted upon by a spring 70 and is attached to the bell crank 63 by means of a pin 71.

The manifold pressure responsive servomotor 13 comprises a casing 80, a flexible diaphragm or pressure responsive element 81, a spring 82, and a spring retaining cup 83. The spring retaining cup 83 and diaphragm 81 are attached to the connecting shaft 28 by means of a screw 84. The spring 82 is disposed under compression within the casing 80 and acts against the retaining cup 83 tending to force the connecting shaft 28 and cam 20 to the right, as shown. The interior of the casing 80 is formed with a port 85 which is connected by means of a conduit 86 to the air intake manifold 87 of the engine. The pressure within the air intake manifold 87 is less than atmospheric pressure whenever the engine is in operation, and atmospheric pressure acting against the diaphram 81 tends to force the connecting shaft 28 and cam 20 to the left against the action of the spring 82.

The reference pressure servomotor 14 comprises a casing 90, a flexible diaphragm or pressure responsive element 91, a spring 92, and a spring retaining cup 93. The spring retaining cup 93 and diaphragm 91 are attached to the connecting shaft 29 by means of a screw 94. The spring 92 is disposed under compression within the casing 90 and acts against the retaining cup 93 tending to force the connecting shaft 29 and cam 20 to the left, as shown. The interior of the casing 90 is formed with a port 95 which is connected by means of a conduit 96 to a reference pressure source 97. When the pressure within the casing 90 is reduced to some predetermined constant low value, atmospheric pressure acting against the diaphragm 91 tends to force the connecting shaft 29 and cam 20 to the right, as shown. The source 97 may be a vacuum pump and related structure of any suitable type capable of producing and maintaining some predetermined constant pressure preferably less than atmospheric pressure.

Alternatively, the diaphragm 91 of the servomotor 14 may be replaced by an evacuated bellows 98 of the same effective area as shown in FIG. 6. In such an embodiment, the pressure source 97 is not required. The diaphragms 81 and 91 are generally circular in shape and each is acted upon by atmospheric pressure. The effective area of the diaphragm 81, however, is slightly larger than the area of the diaphragm 91 for reasons which will be described hereinafter.

*Operation*

In operation, the control system 10 functions as follows:

Whenever the engine is in operation, the injection pump 11 is driven by the engine camshaft or other suitable means and functions to deliver metered charges of fuel to each of the engine cylinders in time with the opening of the respective intake valves. The total output of the injection pump 11 increases directly with engine speed, but the size of the charges varies for different operating conditions. (The fuel output hereinafter referred to is the individual charges size.) The size of the charges of fuel is controlled by the metering valve or shuttle 37 of the pump 11. The operation of the valve 37, in turn, is controlled by the position of the cam 20. Metering forces are provided by the servomotors 13 and 14 and the warm-up mechanism 15, and these forces are combined at the cam 20 for controlling the output of the fuel injection pump 11. For the particular mechanism illustrated in FIG. 1, movement of the cam 20 to the right functions to increase the size of fuel charges delivered by the pump 11 and movement of the cam 20 to the left decreases the size of the fuel charges. The force due to fluid pressure developed within the metering valve 37 is relatively large and this force is exerted through the arm 22 and cam follower 23 on the cam 20. The roller carriage 24 permits relatively friction free horizontal movement of the cam 20 and minimizes hysteresis in the operation of the mechanism 10. Rolling contact between the cam follower 23 and cam surface 21, and between the roller carriage 24 and surface 45 virtually eliminates wear of these elements so that the setting of the control system does not change over a prolonged period of operation.

Whenever the engine is running, the pressure within the air intake manifold 87 is less than atmospheric pressure, the pressure differential depending upon engine speed and the opening of the engine throttle valve (not shown). The force due to the differential in pressure between atmospheric pressure and manifold pressure acting against the diaphragm 81 tends to move the cam 20 to the left, as shown, until it is balanced by the forces exerted by the servomotor 14 and spring 82. For a relatively closed throttle condition, the differential in pressure acting on the diaphragm 81 is a maximum and the cam 20 is moved to the left so as to reduce the output of the fuel injection pump 11. Conversely, for a relatively open throttle condition, the differential in pressure is a minimum and the cam 20 is moved to the right for increasing the output of the pump 11. The manifold pressure servomotor 13, therefore, functions to control the output of the pump 11 in accordance with engine demand as determined by throttle opening.

It should be noted that when atmospheric pressure decreases, as for example due to an increase in altitude, the differential in pressure across the diaphragm 81 is less and the cam 20 is moved to a position tending to increase the output of the pump 11. In other words, the behavior of the servomotor 13 by itself at higher altitudes corresponds exactly to a more open throttle condition at lower altitudes. However, at higher altitudes less air is actually sucked into the engine at a given throttle opening, and, in the absence of some correcting force, the fuel-to-air ratio would be increased at a time when it should be decreased for proper engine operation.

The reference pressure servomotor 14 provides a metering force which offsets the effects of changes in ambient pressure. When the source 97 is in operation, the pressure within the casing 90 is maintained at some constant pressure less than atmospheric pressure. The force due to the differential between atmospheric pressure and the reference pressure acting on the diaphragm 91 tends to move the connecting shaft 29 and cam 20 to the right against the action of the spring 92. An equilibrium position is reached when the force due to the differential pressure is balanced by the force of the spring 92 and the force exerted by the manifold pressure servomotor 13. Since the reference pressure is maintained constant, the differential pressure across the diaphragm 91 varies directly with atmospheric pressure. At higher altitudes, where atmospheric pressure is reduced, the differential pressure is reduced correspondingly, and if the diaphragms 81 and 91 were of the same effective area, the effect of change in atmospheric pressure would be exactly cancelled out.

As indicated above, it is also necessary to correct for changes in exhaust back pressure. The engine pistons must work against the pressure within the exhaust manifold in expelling the exhaust gas from the cylinders. The pressure within the engine exhaust manifold is not measured directly for this purpose, but since it has been found to vary directly with atmospheric pressure, this latter pressure is used. A portion of the exhaust gas is trapped within an engine cylinder at the instant that the exhaust valve closes and is at a pressure near to the pressure within the exhaust manifold. During a portion of the next intake stroke, the trapped exhaust gas expands until the pressure within the cylinder is equal to the pressure within the air intake manifold. During the remainder of the intake stroke, fresh air and fuel vapor is drawn into the cylinder. The amount of fresh air sucked into the cylinder during each intake stroke, therefore, is dependent upon the exhaust back pressure. Since the exhaust manifold is open to atmosphere, the exhaust back pressure therefore decreases with decreasing atmospheric pressure and the metering force to correct for this variation is provided by the control mechanism 10.

The correction factor for the variation in exhaust back pressure is introduced by making the reference pressure diaphragm 91 or bellows 98 smaller in effective area than the manifold pressure diaphragm 81 by some predetermined amount (indicated by "delta r" on FIG. 1). The size of the two diaphragms may vary for different installations, and the difference in size for a given installation may be calculated from the actual compression ratio of the particular engine (which takes into account valve timing). In a preferred embodiment, the reference pressure diaphragm has an effective area of 1.55 square inches and the manifold pressure diaphragm has an effective area of 1.85 square inches. Since the manifold pressure diaphragm 81 is larger by a fixed amount than the reference pressure diaphragm 91, a differential in force is produced which acts to move the cam 20. This differential force varies directly with atmospheric pressure in the same way that the exhaust back pressure is assumed to vary with atmospheric pressure.

The warm-up enrichment mechanism 15 is effective to increase the fuel-to-air ratio supplied to the engine until it reaches a normal operating temperature. When the engine and its cooling liquid are cold, the movable shaft 68 of the temperature responsive element 67 is retracted and the spring 70 forces the plunger 69 to the right, as shown. The plunger 69 acts to turn the bell crank 63 about the pin 64 and exerts a force through the cable 62 on the bell crank 60. The bell crank 60 is turned about the pin 61 and is effective to raise the roller 42 of the roller carriage 24 and thereby raise one end of the cam 20. The slot 26 formed in the cam 20 permits the tilting of the cam 20 (as shown in FIG. 5) for increasing the output of the pump 11 in accordance with the temperature of the engine cooling liquid. When the engine cooling fluid reaches some predetermined operating temperature, the shaft 68 moves to the left, as shown, and forces the plunger 69 against the action of the spring 70 to the position shown in FIG. 1. The force on the cable 62 is relaxed, and the bell crank 60 is retracted into the slot 52 formed in the rail 25, as shown in FIG. 2. The influence of the warm-up mechanism 15 thereafter is completely removed, the roller carriage 24 rolls freely along the rail 25, and the cam 20 is moved only under the influence of the servomotors 13 and 14. Removal of the effect of the warm-up mechanism 15 thereby removes at least one possibility of frictional drag or hysteresis of the operation of the control mechanism 10. The warm-up mechanism 15 may be any suitable structure capable of moving the cam 20 in the manner described.

There has been provided by this invention an improved control system for a fuel injection pump that is effective to meter accurately charges of fuel delivered to the engine cylinders for all operating conditions. The system provides metering forces for controlling the output of the pump in accordance with engine demand as determined by engine load and changes in atmospheric pressure, and includes a metering force for correcting for changes in exhaust back pressure. The system thereby operates to control the pump 11 directly as a function of absolute manifold pressure of the engine. The system also introduces a metering force that is effective to increase the output of the pump during engine warm-up, and this force is completely removed from the system when a predetermined normal operating temperature is reached.

The improved control system herein described is shown as operating a fuel injection system, but may be used to advantage with other fuel metering devices, where control as a function of absolute manifold pressure is desired.

It is to be understood that the invention is not to be limited to the specific constructions and arrangements shown and described, except only insofar as the claims may be so limited, as it will be understood to those skilled in the art that changes may be made without departing from the principles of the invention.

What is claimed is:

1. In a control system for a fuel metering device adapted to supply fuel to an internal combustion engine having an air-intake manifold, the combination of a movable cam connected to control the output of the device, a first actuator connected to the air-intake manifold of the engine and to said cam for exerting a metering force thereon for moving said cam in accordance with changes in pressure within the air-intake manifold, a second reference pressure actuator also connected to said cam for exerting a metering force thereon to adjust the position of said cam in accordance with changes in ambient pressure, said cam being positioned between said first and second actuators and adapted for longitudinal movement, shaft means directly interconnecting said actuators and said cam, said cam, shaft interconnecting means and actuators being constructed and arranged for joint linear reciprocation, whereby said cam is moved to an equilibrium position of the metering forces exerted by said actuators.

2. The device of claim 1 including a fixed supporting rail, a roller carriage disposed between said cam and said rail, roller means carried by said roller carriage and in contact with said cam for permitting relatively friction-free movement of said cam under the influence of said actuators.

3. The device of claim 1 including tilting means connected to said cam to tilt said cam from its normal longitudinal plane for increasing the output of the fuel metering device during engine warm-up.

4. The device of claim 3 wherein the tilting means is a temperature responsive element responsive to engine temperature.

5. The device of claim 1 wherein the shaft means directly interconnecting said actuators is a single shaft on which said cam is mounted.

6. The device of claim 1 wherein the second reference pressure actuator is an evacuated bellows.

References Cited in the file of this patent

UNITED STATES PATENTS

| | | |
|---|---|---|
| 2,435,902 | Reggio | Feb. 10, 1948 |
| 2,440,566 | Armstrong | Apr. 27, 1948 |
| 2,516,828 | Reggio | July 25, 1950 |
| 2,670,724 | Reggio | Mar. 2, 1954 |
| 2,876,755 | Gold et al. | Mar. 10, 1959 |
| 2,891,701 | Downing et al. | June 23, 1959 |